(12) United States Patent
Goel et al.

(10) Patent No.: US 7,689,916 B1
(45) Date of Patent: Mar. 30, 2010

(54) AUTOMATICALLY GENERATING, AND PROVIDING MULTIPLE LEVELS OF, TOOLTIP INFORMATION OVER TIME

(75) Inventors: Amit Goel, Broomfield, CO (US); Mike Krack, St. Petersburg, FL (US); Jai Pugalia, San Jose, CA (US); Ronald Rozensky, Bradenton, FL (US); Lee Shero, McKinney, TX (US)

(73) Assignee: Avaya, Inc., Basking Ridge, NJ (US)

( * ) Notice: Subject to any disclaimer, the term of this patent is extended or adjusted under 35 U.S.C. 154(b) by 465 days.

(21) Appl. No.: 11/728,866

(22) Filed: Mar. 27, 2007

(51) Int. Cl.
*G06F 3/048* (2006.01)
*G06F 3/00* (2006.01)
*G06Q 30/00* (2006.01)

(52) U.S. Cl. .......................... 715/711; 715/744; 705/14

(58) Field of Classification Search ................ 715/711, 715/744; 705/14
See application file for complete search history.

(56) References Cited

U.S. PATENT DOCUMENTS

| | | | | |
|---|---|---|---|---|
| 5,995,101 A * | 11/1999 | Clark et al. | ................ | 715/711 |
| 6,243,724 B1 | 6/2001 | Mander et al. | | |
| 6,563,514 B1 * | 5/2003 | Samar | ....................... | 715/711 |
| 6,848,077 B1 * | 1/2005 | McBrearty et al. | .......... | 715/206 |
| 2003/0076344 A1 * | 4/2003 | Chatani et al. | ............... | 345/711 |
| 2004/0036714 A1 * | 2/2004 | Blakely et al. | ............... | 345/711 |
| 2004/0119713 A1 * | 6/2004 | Meyringer | ................. | 345/440 |
| 2008/0034329 A1 * | 2/2008 | Posner et al. | ................ | 715/856 |

OTHER PUBLICATIONS

Julia Lerman "Dynamically Updated Portions of Cached Web Pages with Post-Cache Substitution", Oct. 14, 2006, 3 pages.*
Abstraction Systems, "ToolTipsFactory for .Net—.Net WinForms—V1.2—Summary", http://www.componentsource.com/products/tooltipsfactory-net/summary.html., 6 pp.
"What is overLIB", http://www.bosrup.com/web/overlib, overLIB Homepage, 3 pp.
"Introduction", http://www.bosrup.com/web/overlib/?Documentation, overLIB Documentation, 4 pp.
"Writing to Layers", http://www.dyn-web.com/dhtml/write-lyrs/, Dynamic Web Coding, 2 pp.
"Link Menu—Popup Menu Anywhere", http://www.dyn-web.com/dhtml/menu-layers/, Dynamic Web Coding, 2 pp.

* cited by examiner

*Primary Examiner*—William L Bashore
*Assistant Examiner*—Andrea N Long
(74) *Attorney, Agent, or Firm*—Douglas M. Grover

(57) ABSTRACT

A tooltip is updated dynamically as a user continues to hover a cursor over any displayed item for which additional information is available. The initial tooltip is terse or has one type of information, while the updates add more or substitute different information. Tooltips are created dynamically from whatever information is available about displayed items at the time. A client displays a web page, while a server identifies displayed items for which additional information is available, obtains the information, and either provides the information to the client to generate tooltips therefrom or generates the tooltips and provides them to the client.

18 Claims, 6 Drawing Sheets

AUTOMATICALLY GENERATING, AND PROVIDING MULTIPLE LEVELS OF, TOOLTIP INFORMATION OVER TIME

TECHNICAL FIELD

This invention relates generally to displaying of information and specifically to tooltips.

BACKGROUND OF THE INVENTION

Many web pages and applications are constrained in screen space or back-end computing resources and cannot always provide full detailed information or content to all users. In these cases, users must click on a link to view detailed information either on a separate page or as a pop-up. In many cases, application pop-ups block access to the original page or application by not providing multi-threaded access to the original page or application; in other cases, pop-ups are blocked by browsers. For web application links, the original content may be superseded by the linked content, such that the user may not be able to view both sets of content simultaneously. It is possible for the user to open the link in a new window or tab, but this technique consumes memory and CPU cycles and adds another application to the display screen real-estate. Some applications do not support opening of links in a new window. The user interface must be altered in advance by a website developer or application developer to provide these links. Some web applications provide tooltips with a single level of static content when a user hovers their mouse pointer over certain display elements (controls). The tooltip disappears if the user continues to hover their mouse pointer over the element. To provide more detailed information, web page designers must create clickable links or icons next to the elements where additional information is made available.

U.S. Pat. No. 5,995,101 discloses a graphical user interface (GUI) for use in a graphical display on a computer monitor that includes a cursor that allows a user to point to an area of interest in the graphical display, such as a tooltip. The GUI includes an information element that provides a first level of information in the graphical display when the user first points to the area of interest and then provides a subsequent level of information in the graphical display if the user continues to point to the area of interest or presses a selected keystroke. Dynamic sourcing of the tooltip information is not described.

SUMMARY OF THE INVENTION

This invention is directed to solving these and other problems and disadvantages of the prior art. One aspect of the invention provides a dynamic tooltip-generation capability, such that a tooltip can be generated from whatever information is available about display items at the time. According to this aspect of the invention, when a page of information is displayed, those items in the page that may have additional information associated with them are identified, the additional information is obtained for at least some of the identified items, the items for which additional information was obtained are indicated (e.g., in the displayed page), and tooltips for the indicated items are created from the obtained information. When a pointer points to one of the indicated items in the displayed page, one or more tooltips for the pointed-to item are displayed. The additional information is illustratively obtained by using conventional web browser technology.

Another aspect of the invention provides a tooltip which gets updated dynamically as a user continues to hover a pointer (e.g., a cursor) over any item displayed on a screen for which additional information is available. If the mouse pointer is not moved within a user-configured time period, the tooltip, instead of disappearing, is updated with other information. For example, the tooltip is updated with additional information, more detailed information, or information of a different type. Information in the tooltip may be color-coded, shaded, underlined, or otherwise denoted in such a way that the user may know when the data search (data drill-down) is completed. For example, the data may be displayed as black text on white background where the text becomes lighter and the background becomes darker as each layer of drill-down is shown. When the two shades reverse, no more layers are available. Alternatively, a progress bar may be displayed either with the tooltip, as a part of the tooltip, or integrated into the tooltip, such that the user will be informed of the progress of drilling down into the accessible information. The process preferably continues until all available tooltip information has been retrieved and presented. According to this aspect of the invention, when a pointer points to an item (word, term, icon, image, etc.) on a display, then in response to the pointer pointing to the item for a first predetermined time, a tooltip that includes first information is displayed for the item. In response to the pointer pointing to the item for an additional second predetermined time, a tooltip that includes second information that differs at least in part from the first information is displayed for the item.

The invention has been characterized above in terms of method. But the invention also includes apparatus for performing the method, as well as at least one computer medium containing instructions which, when executed on one or more computers, cause the computers to perform the method.

BRIEF DESCRIPTION OF THE DRAWING

These and other features and advantages of the invention will become more apparent from considering the following description of an illustrative embodiment of the invention together with the drawing, in which.

DETAILED DESCRIPTION

Figure 1:
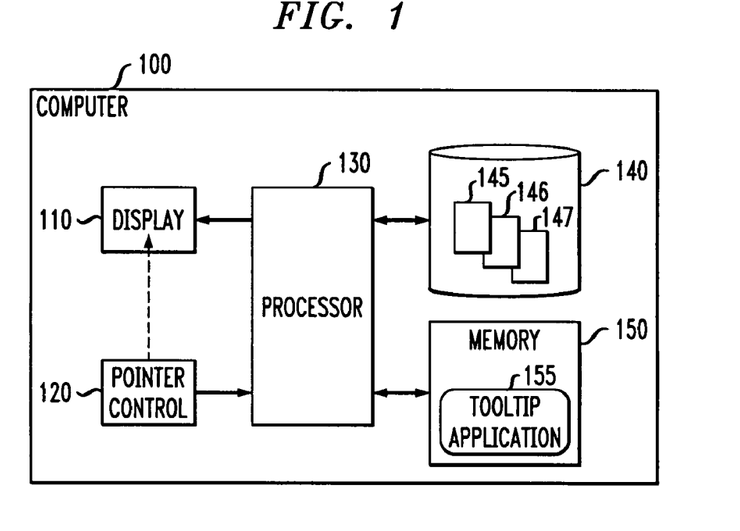
FIG. 1 is a block diagram of a computer that includes an illustrative implementation of an aspect of the invention.
Figure 2:
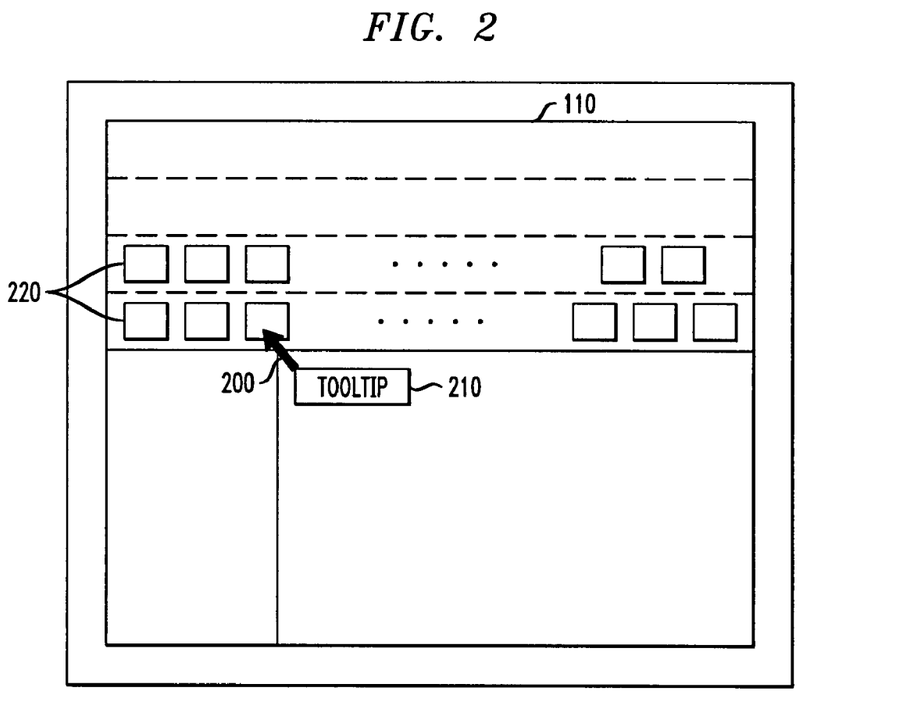
FIG. 2 is a first screenshot of a display of the computer of FIG. 1.

FIG. 1 shows a system 100 that includes an illustrative embodiment of one aspect of the invention. System 100 is illustratively a computer or a personal digital assistant (PDA). System 100 comprises a display 110, such as a screen, a pointer control 120, such as a mouse or a stylus, a processor 130 that is connected to pointer control 120 and display 110 to receive instructions from pointer control 120 and execute them on a pointer 200 (illustratively a cursor) in display 110, and memory 150 and a dedicated or shared (e.g., networked) computer-readable storage medium 140 that stores programs and data for use by processor 130, such as a disk, memory sticks, CD-ROMs, DVD-ROMs, etc. Memory 150 stores a tooltip application 155—a program that causes a tooltip 210 to be displayed when pointer control 120 points cursor 200 to (hovers cursor over) a control 220 displayed on display 110, as shown in FIG. 2. As described so far, system 100 is conventional.

Figure 3:
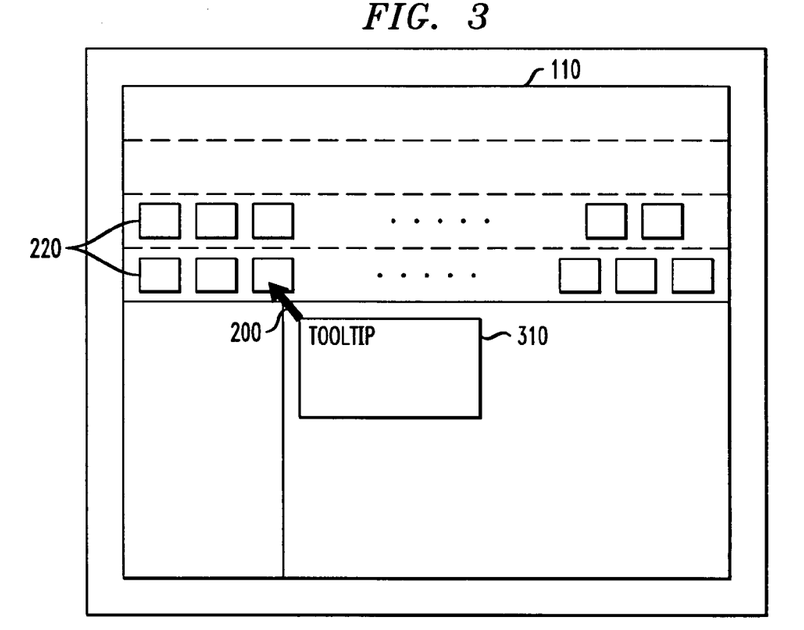
FIG. 3 is a second screenshot of the display of the computer of FIG. 1.
Figure 4:
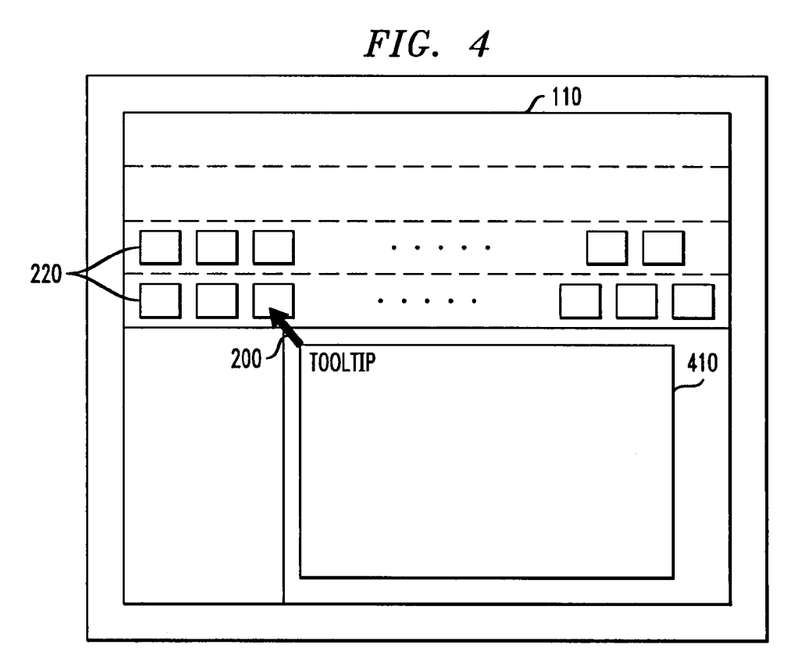
FIG. 4 is a third screenshot of the display of the computer of FIG. 1

According to one aspect of the invention, tooltip application 155 is adapted to provide a multi-layer tooltip capability whereby the amount or detail or type of information displayed by a tooltip changes over time as cursor 200 continues to hover over a control 220, as shown in FIGS. 2-4. FIGS. 2-4 each show screen 110 displaying a window of information, including a plurality of controls 220 one of which has cursor 200 positioned over it, thereby resulting in the displaying of a tooltip 210, 310, 410 for that control 220. Tooltip 210 is initially terse in the amount or detail of information that it displays, as shown in FIG. 2. As cursor 200 continues to hover over control 220, tooltip 310 advances to display as lower level of tooltip information that is more expansive or detailed than the information displayed by tooltip 210, as shown in FIG. 3. The new information may be shaded, highlighted, underlined, bolded, or otherwise made visibly different in font, font type, color or format to distinguish it from previously-displayed information. As cursor 200 continues to hover over control 220 for even a longer period of time, tooltip 410 advances to display an even lower level of tooltip information than tooltip 310, as shown in FIG. 4. Again, the new information may be made to look different from the previously-displayed information. While the illustrative embodiment of FIGS. 2-4 shows three levels of tooltip information, any number of two or more levels of information may be employed.

Figure 5:
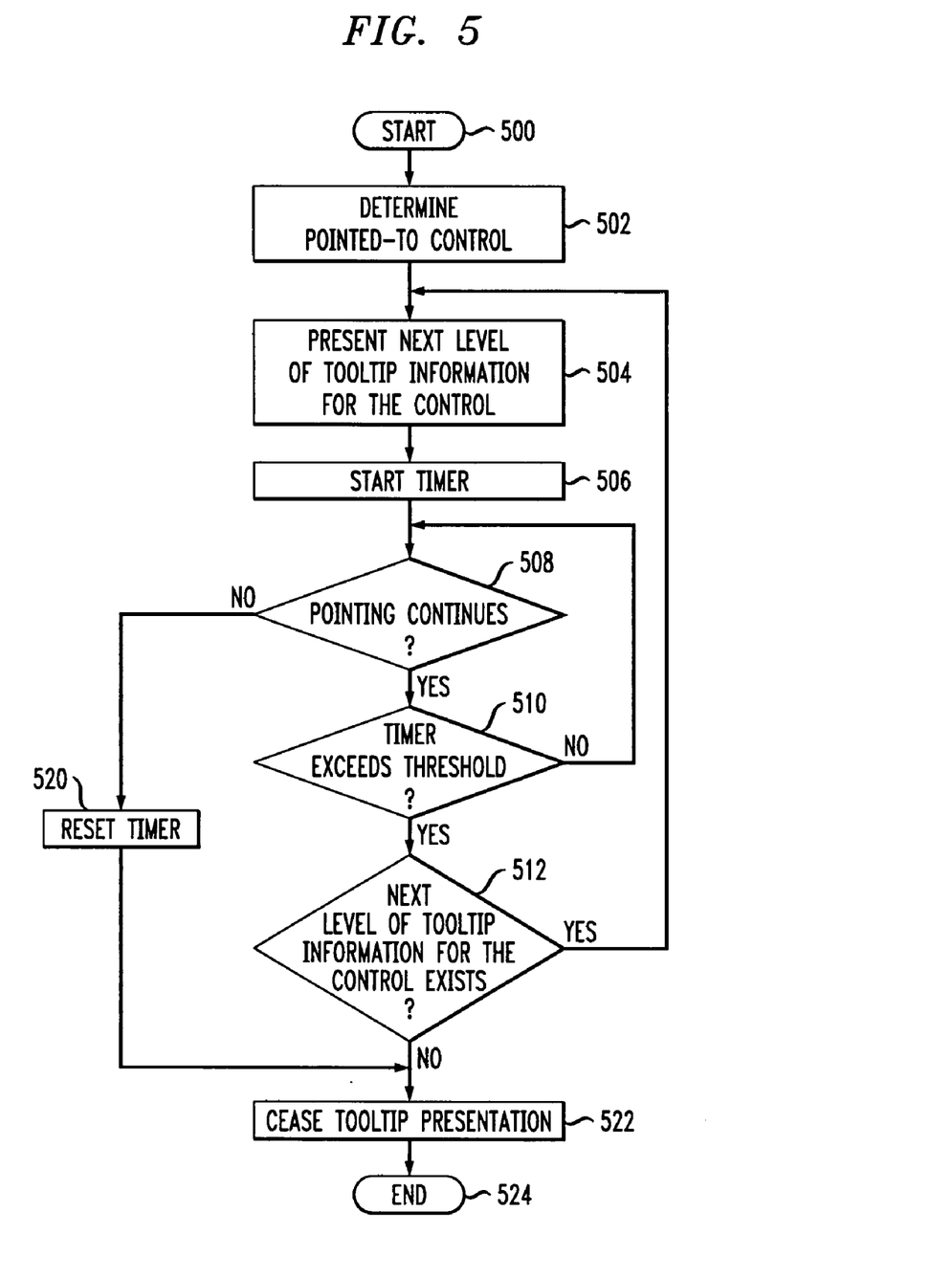
FIG. 5 is a functional flow diagram of operation of a processor of the computer of FIG. 1 executing a tooltip application.

FIG. 5 shows the operative aspects of tooltip application 155 that are relevant to an understanding of this embodiment of the invention. When a user begins to hover cursor 200 over a control 220 in display 110 that has a tooltip associated therewith, processor 130 starts execution of tooltip application 155, at step 500. Processor 130 will have determined which control 220 is being pointed to, at step 502, so under control of tooltip application 155, processor 130 retrieves a first level of tooltip information 145 from storage medium 140 and displays it on screen 110 as tooltip 210 of FIG. 2, at step 504. Tooltip application 155 may be configurable such that secure remote access is established to another data store as needed. Processor 130 also starts a timer to time the length of time that cursor 200 points to control 220, at step 506. As long as cursor 200 continues to point to control 220, as determined at step 508, and the timer has not timed out, as determined at step 510, displaying of tooltip 210 continues. If cursor 200 ceases to point to control 220 before the timer times out, processor 130 resets the timer, at step 520, ceases to display tooltip 210, and ends execution of tooltip application 155.

Returning to step 510, if the timer times out while cursor 200 is still pointing to control 220, processor 130 checks if a next level of tooltip information 146 is available, at step 512. If not, processor 130 proceeds to steps 522 et seq. But if so, processor 130 returns to steps 504 et seq. to retrieve the next level of tooltip information 146 from storage medium 140 and display it as tooltip 310. The process continues to repeat, with the next level of tooltip information 147 being presented as tooltip 410, and so on, until the levels of tooltip information are exhausted, as determined at step 512.

Figure 6:
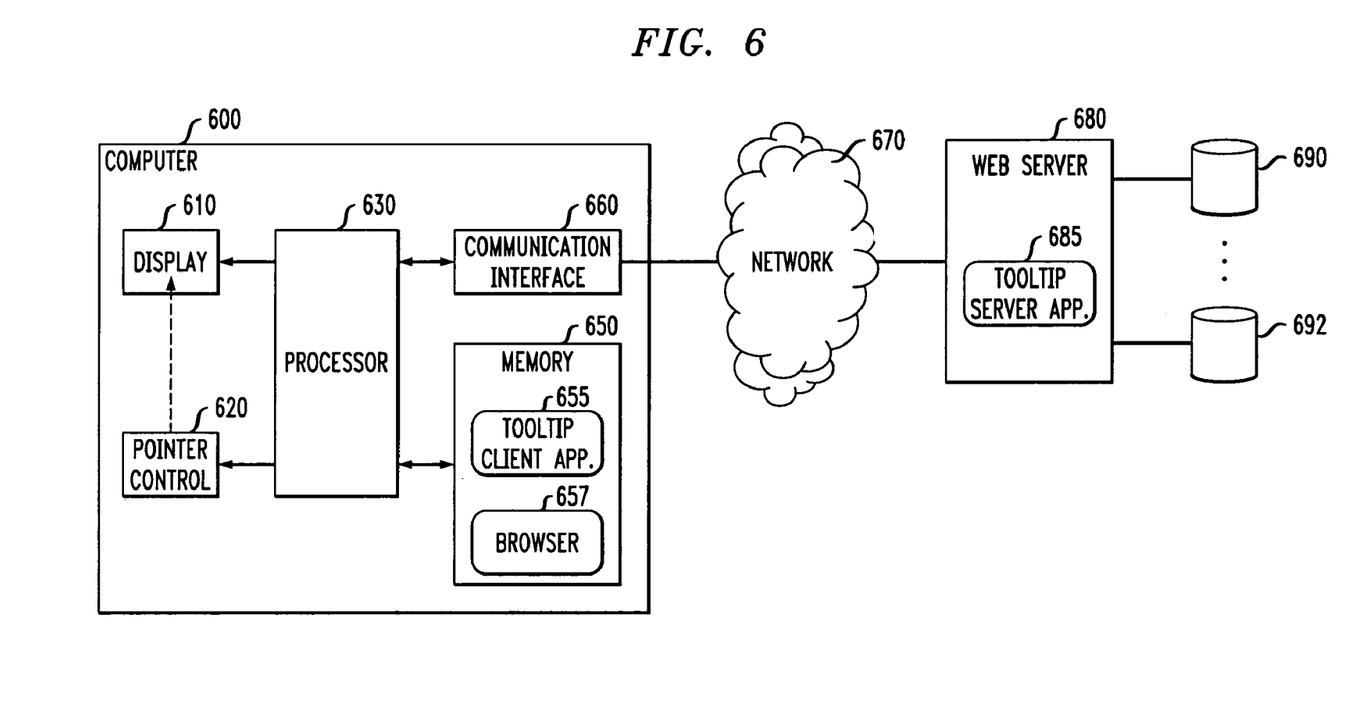
FIG. 6 is a block diagram of a web browsing system that includes an illustrative implementation of another aspect of the invention.

FIG. 6 shows a system that implements an illustrative embodiment of another aspect of the invention. The system of FIG. 6 is a web-browsing system, comprising a client computer 600 that has a processor 630, a display 610, a pointer control 620, and memory 650 or any other computer-readable storage medium that is located on one or more computers, shared drives, or other resources. Memory 650 contains a web browser 657 for browsing the web, and computer 600 further includes a communication interface 660 that connects computer 600 through network 670 to a web sever 680 that retrieves web pages from various stores 690-692 on a network and presents them to browser 657. Browser 657 and server 680 illustratively cooperate with each other using asynchronous Java Script and XML (AJAX), Java Server Faces (JSF), or another standard client-server framework. As described so far, the system of FIG. 6 is conventional.

Although FIG. 6 shows computer 600 and web server 680 as being separate entities separated by network 670, in an alternative embodiment, they may comprise a single entity.

According to the invention, memory 650 of computer 600 stores a tooltip client application 655, and web server 680 stores and executes a tooltip server application 685. Tooltip client application 655 is illustratively equivalent to tooltip application 155 of FIG. 1. Tooltip server application 685 substitutes for storage medium 140 of FIG. 1 as a source of tooltip information 145-147. Tooltip server application 685 may be configured such that secure remote access is established to another data store as needed.

Figure 7:
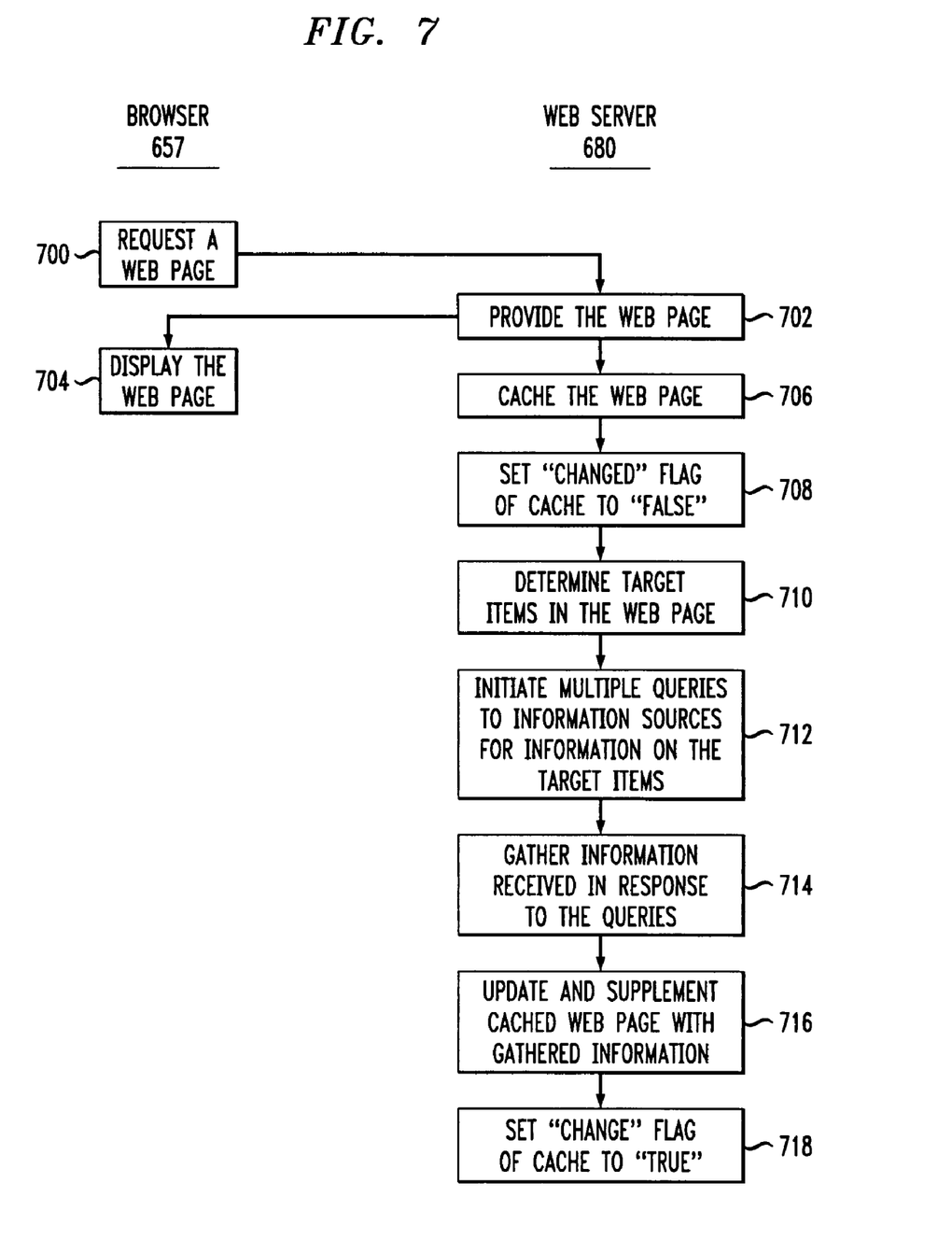
FIGS. 7-8 are functional flow diagrams of operation of a browser of a client computer of the system of FIG. 6 and a server of the system of FIG. 6 executing a tooltip server application.
Figure 8:
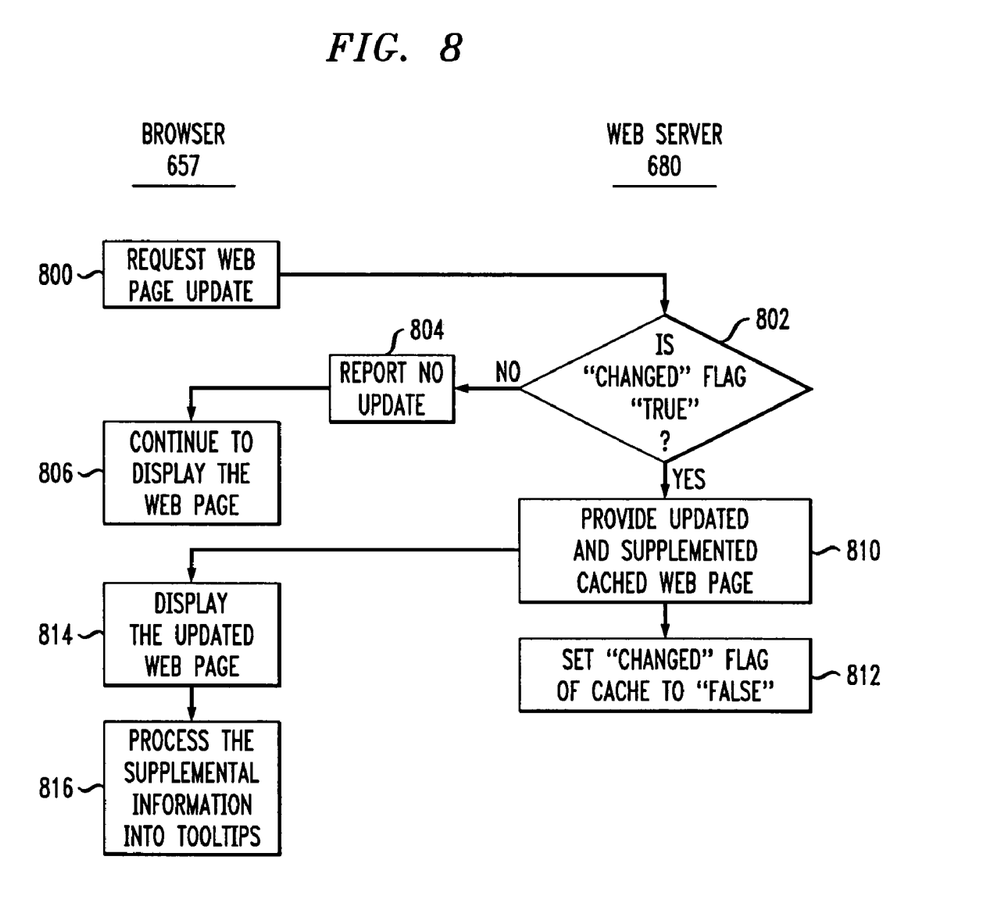

FIGS. 7-8 show the operative aspects of browser 657 and web server 680 that are relevant to an understanding of this embodiment of the invention. In response to browser 657 requesting a particular web page, at step 700 of FIG. 7, web server 680 provides the requested web page, at step 702, and browser 657 displays the received web page on display 610 of computer 600, at step 704. Web server 680 also saves a copy of the web page in a cache, at step 706. All of this may be done in a conventional manner. Web server 680 then executes tooltip server 685 application to effect the remaining steps of FIG. 7. At step 708, web server 680 sets a "changed" flag that is associated with the cached web page to a "false" state. Web server 680 then determines target items in the web page, at step 710. Target items are those items of the web page, such as words, phrases, images, icons, controls, etc., that may have tooltips associated with them. Target items may be determined in any desired manner. For example, web server 680 may parse the web page to identify significant terms in the web page, such as names, telephone numbers, etc. Or, web server 680 may compare the items that constitute the web page against a list of items for which information may be available.

Having identified the target items at step 710, web server 680 initiates queries to multiple information sources 690-692 for information relating to the target items, at step 712. The information may be the copy of the information itself, or a pointer to (e.g., an address of) the information. In the latter case, the information may include security credentials, certificates, or other login information as will permit client computer 600 to access the pointed to information. As it receives responses from information sources 690-692, web server 680 gathers the received information, at step 714 and uses the gathered information to update and supplement the cached web page, at step 716. For example, web server 680 attaches the gathered information to the web page as an attachment, highlights, underlines, or otherwise marks the target items in the web page for which it has gathered information in order to indicate to a user that these items have associated tooltips, and associates links with the marked target items that point to the corresponding additional information. Web server 680 also sets the "changed" flag of the cached web page to "true" to indicate that the cached web page has been changed, at step 718.

Browser 657 periodically requests update to the web page that it received at step 702, at step 800 of FIG. 8. In response, server 685 checks whether the "changed" flag of the cached copy of the web page is set to "true" state, at step 802. If not, web server 680 so reports to browser 657, at step 804, and browser 657 continues to display the previously-received version of the web page, at step 806. If the "changed" flag is set to "true," web server 680 provides the updated cached version of the web page along with the supplementary information to browser 657, at step 810, and then changes the state of the "changed" flag back to "false" to indicate that browser 657 has been provided with the changed web site, at step 812. Browser 657 receives and displays the updated web page, at step 814. Browser 657 also provides the supplemental information to tooltip client 655, and tooltip client 655 uses the supplemental information to create one or more levels of tooltips for the target items, at step 816. Thus, the presentation of a page need not be altered by a developer, as the auto-drilldown software on web server 680 creates dynamic "links/hotspots". Whenever additional information exists for the information beneath these "links/hotspots", that information is presented in a tooltip, which expands automatically over time.

Of course, various changes and modifications to the illustrative embodiment described above will be apparent to those skilled in the art. The term "tooltip" as used herein should be read expansively. For example, Outlook may be modified such that when a mouse pointer is placed over the name of someone who sent an email, their email address and phone number are displayed. If the mouse pointer continues to hover over the sender's name, the sender's address is displayed. If the mouse pointer continues to hover over the sender's name, their time zone is displayed. Finally, Google Earth appears with the "From" location as the sender's address and the "To" location as the user's address. Google Earth also displays the sender's time zone and the user's time zone. Also, a trigger, e.g., a hot-key, may be associated with the pointer to trigger the next level of information. For example, if a user holds their pointer over an item and the tooltip is displayed, and then the user inadvertently moves the pointer away, they will have lost the tooltip. But if the user were to move the pointer over the item and select a hot-key to display the tool tip, it becomes much faster and more efficient than having to wait for the tooltip to reappear. These changes and modifications can be made without departing from the spirit and the scope of the invention and without diminishing its attendant advantages. It is therefore intended that such changes and modifications be covered by the following claims except insofar as limited by the prior art.

What is claimed is:

1. A method comprising:
a web client requesting a page of information;
a web server providing the page of information to the web client in response to the request;
the web client displaying the page of information;
identifying in the page those items that may have additional information associated with them;
obtaining the additional information for those items that may have additional information associated with them;
indicating the identified items in the page;
creating tooltips in the web server for those items that may have additional information associated with them;
providing in the web server the additional information and the tooltips to the web client;
pointing a pointer to one of those items that may have additional information associated with them in the displayed page;
in response to the pointing, displaying a tooltip for the pointed-to item, wherein the displaying of a page of information, the pointing, the indicating, and the displaying of a created tooltip are effected by the web client, and the creating is effected by one of the web client and the web server; wherein indicating comprises:
the web server caching the page;
the web server indicating those items that may have additional information associated with them in the cached page;
the web client requesting an undated said page;
in response to the requesting of the updated page, the web server providing the cached page indicating those items that may have additional information associated with them, and one of the obtained information and the tooltips, to the web client; and
in response to the providing of the cached page, the web client displaying the provided cached page.

2. The method of claim 1 wherein:
the web server providing the additional information and the tooltips to the web client comprises
the web server providing to the web client a pointer to the additional information and the tooltips.

3. The method of claim 2 further comprising:
the web server providing security credentials, certificates, or other login information to the web client such that the web client may securely connect to another server pointed to by the pointer to obtain the additional information and the tooltips.

4. The method of claim 1 wherein:
displaying a tooltip comprises
in response to the pointer pointing to the pointed-to item for a first predetermined amount of time, displaying for the pointed-to item a created tooltip that includes first information, and
in response to the pointer pointing to the pointed-to item for an additional second predetermined amount of time, displaying for the pointed-to item a created tooltip that includes second information of the additional information that at least in part differs from the first information.

5. The method of claim 4 wherein:
the second information is more detailed than the first information.

6. The method of claim 4 wherein:
the second information is of a different type than the first information.

7. The method of claim 4 wherein:
the second information is shaded, highlighted, underlined, bolded, or otherwise visibly different in font, font type, color, or format from the first information.

8. The method of claim 4 further comprising:
in response to the pointer pointing to the item for a third predetermined amount of time in addition to the second predetermined amount, displaying for the pointed-to item a created tooltip that includes third information of the additional information that at least in part differs from both the first and the second information.

9. The method of claim 8 wherein:
the third information is shaded, highlighted, underlined, bolded, or otherwise visibly different in font, font type, color, or format from the second information.

10. At least one computer-readable medium storing instructions which, when executed by at least one computer, cause the at least one computer to perform the method of one of the claims 1, 2-3, and 4-9.

11. An apparatus comprising:
a display for displaying a page that comprises items;
a pointer for pointing to the displayed items;
a store for storing tooltips for the items;
one or more processors adapted to cooperate for identifying in the page those items that have additional information associated with them, for obtaining the additional information for those items that have additional information associated with them from external sources, for indicating those items that have additional information associated with them in the page, for creating tooltips for those items that have additional information associated with them from the obtained information, and adapted to respond to the pointer pointing to one of those items that have additional information associated with them in the displayed page, for displaying a tooltip for the pointed-to item;
the display and the pointer are included in a web client; and
the one or more processors comprise
a first processor included in the web client, for requesting a page of information, and adapted to respond to the pointer pointing to one of those items that have additional information associated with them in the displayed page, for displaying a tooltip for the pointed-to item,
a second processor included in a web server, for providing the page of information to the web client in response to the request, for identifying in the page those items that have additional information associated with them, for obtaining the additional information for those items that have additional information associated with them from external sources, for indicating those items that have additional information associated with them in the page, and for providing the additional information and the tooltips to the web client; wherein
one of the first processor and the second processor is adapted for creating the tooltips for those items that have additional information associated with them from the obtained information
the first processor is further adapted for requesting an updated said age, and for displaying a page provided in response to the request; and
the second processor is further adapted for caching the page, for indicating those items that have additional information associated with them in the cached page, and for providing the cached page indicating those items that have additional information associated with them, and one of the obtained information and the tooltip, to the web client in response to the request for the undated said page.

12. The apparatus of claim 11 wherein:
the one or more processors are adapted to display for an item a created tooltip that includes first information in response to the pointer pointing to the item for a first predetermined amount of time, and are further adapted to display for the pointed-to item a created tooltip that includes second information of the additional information that differs at least in part from the first information in response to the pointer pointing to the pointed-to item for an additional second predetermined amount of time.

13. The apparatus of claim 12 wherein:
the second information is more detailed than the first information.

14. The apparatus of claim 12 wherein:
the second information is of a different type than the first information.

15. The apparatus of claim 12 wherein:
the one or more processors are further adapted to respond to the pointer pointing to the displayed item for a third predetermined amount of time in addition to the second predetermined amount, for displaying for the pointed-to item a created tooltip that includes third information of the additional information that differs at least in part from both the first and the second information.

16. The apparatus of claim 11 wherein:
the display and the pointer are included in an application client;
the one or more processors comprise
a first processor included in the application client, for requesting information and for displaying the requested information, and adapted to respond to the pointer pointing to one of those items that have additional information associated with them in the displayed information, for displaying a tooltip for the pointed-to item, and
a second processor included in an application server, for providing the requested information to the application client in response to the request for identifying in the provided information those items that have additional information associated with them, for obtaining the additional information for those items that have additional information associated with them, and for providing the additional information and the tooltips to the application client; wherein
one of the first processor and the second processor is adapted for creating the tooltips for those items that have additional information associated with them from the obtained information.

17. The apparatus of claim 16 wherein:
the second processor is adapted to query one or more other processors on a network.

18. A method comprising:
a web client requesting a page of information;
a web server providing the page of information to the web client in response to the request;
the web client displaying the page of information;
identifying in the page those items that may have additional information associated with them;
obtaining the additional information from the web server for those items that may have additional information associated with them;
indicating the first items those items that have additional information associated with them in the page;
creating tooltips in the web server for the first items those items that have additional information associated with them from the obtained information;
providing in the web server the additional information and the tooltips to the web client;
pointing a pointer to one of the first items those items that have additional information associated with them in the displayed page;
in response to the pointing, displaying a tooltip for the pointed-to item; wherein
the displaying of a page of information, the pointing, the indicating, and the displaying of a created tooltip are effected by the web client, the creating is effected by one of the web client and the web server;

the web server providing the additional information and the tooltips to the web client comprises the web server providing to the web client a pointer to the additional information and the tooltips; and the web server providing security credentials, certificates, or other login information to the web client such that the web client may securely connect to another server pointed to by the pointer to obtain the additional information and the tooltips.

* * * * *